Inventor
MICHAEL J. BURGER
By M. C. Hayes
Attorney

April 3, 1951 M. J. BURGER 2,547,809

PULSE ABSORBING CIRCUITS

Filed Nov. 26, 1945 3 Sheets-Sheet 2

Inventor
MICHAEL J. BURGER

By M. C. Hayes

Attorney

April 3, 1951 M. J. BURGER 2,547,809

PULSE ABSORBING CIRCUITS

Filed Nov. 26, 1945 3 Sheets-Sheet 3

INVENTOR

MICHAEL J. BURGER

BY A. H. Helvestine

ATTORNEY

Patented Apr. 3, 1951

2,547,809

UNITED STATES PATENT OFFICE 2,547,809

PULSE ABSORBING CIRCUIT

Michael J. Burger, Murray Hill, N. J., assignor to the United States of America as represented by the Secretary of the Navy Application November 26, 1945, Serial No. 630,936

5 Claims. (Cl. 250—27)

My invention relates to communication circuits and more particularly to methods of and means for preventing transient voltage surges when an amplifier channel is rendered inoperative.

The present application is a companion case to Application No. 696,925 filed September 13, 1946 by Michael J. Burger, Russel W. Collins, and Arthur S. Cosler, now Patent No. 2,493,336, issued January 3, 1950, which application was co-pending with the present application.

It is frequently necessary to render an amplifier channel inoperative. For example, in radar, sonar, and similar object detecting equipments, it may be desired to render the system inoperative when a transmitted pulse of energy is produced, in order to eliminate the effects of the transmitted energy pulse on the receiving system. Similarly, where a single radio receiving equipment is adapted to respond to a number of transmitted signals, it is likewise desirable to have a method of blocking the channels when information from a particular channel is to be received, thus eliminating the noise contributed by the unused channels and preventing interference therefrom.

A convenient method of blocking the operation of an amplifier path is to supply grid bias beyond the cut-off point to one of the tubes in the circuit. Plate current then ceases to flow and, regardless of the later input signals or noise, no indication in the output circuit is produced. This method has, however, a significant disadvantage for the application of cut-off bias causes the entire system to suddenly pass to the condition of zero plate current. In particular, coupling condensers must change from the initial value of charge before cut-off to a new value corresponding to cut-off, thereby introducing voltage and current surges throughout the circuit. These surges contain a wide range of frequency components and appear in the output circuit as an audible click. This click may be so annoying that the very purpose for which the circuit is designed, namely reducing the noise level, is defeated.

I have found that the above mentioned disadvantages of blocking an amplifier path by applying cut-off grid bias may be eliminated by causing the coupling condensers in the circuit to remain at the same value of charge as before cut-off. That is, if a particular coupling condenser is charged to 150 volts during normal operation and would ordinarily charge to 300 volts upon cut-off, I provide circuits which cause the condenser to remain at 150 volts when cut off bias is supplied. The voltage and current surges incident to charging the condenser from 150 to 300 volts are thereby eliminated and the click or other disturbance avoided.

In accordance with my invention the voltage at the coupling condenser from an amplifier stage being cut off to the next stage is maintained constant by the use of a grid controlled or similar tube which is caused to conduct when plate current of the amplifier tube is desired to be cut off. The grid controlled tube is connected so that the current drawn by it simultaneously biases the amplifier tube to cut-off and draws current through the plate resistance of that tube which holds the voltage at the coupling condenser to the value existing before cut-off. The coupling condenser therefore experiences no change in applied voltage and no transient current or voltage surge takes place.

While this invention is susceptible of various modifications and alternative construction, I have shown in the drawings and will herein describe in detail only the preferred embodiments. It is to be understood, however, that I do not intend to limit the invention by such disclosure for I aim to cover all modifications and alternative constructions falling within the spirit and scope of the invention as defined in the appended claims.

Figure 1:
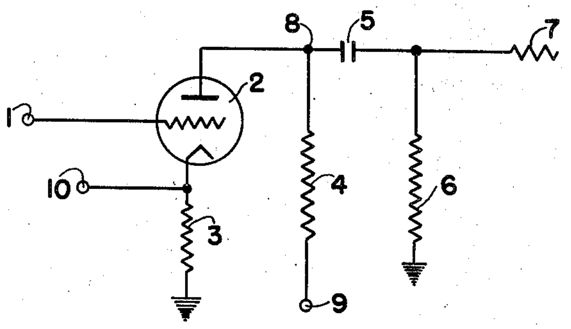
Figure 1 shows a schematic circuit diagram of a conventional amplifier.

Referring now to Figure 1, which shows a circuit diagram of a conventional triode amplifier. The grid of tube 2 is connected to a source of input signals. The plate of tube 2 is connected to point 8 which in turn is connected through plate resistance 4 to a source of positive plate potential 9. The cathode of tube 2 is connected through resistance 3 to ground. Coupling condenser 5 is connected to point 8 and to the grid of the succeeding tube 7. The grid return for the latter tube is provided by resistance 6.

When it is desired to prevent operation of the amplifier shown in Figure 1, cut-off bias is supplied to the grid of tube 2. Variation in input signals will then have no effect on the potential of point 8 and therefore have no influence on the grid 7 of the succeeding state. This cut-off bias may be accomplished by a strong negative signal at the grid input circuit 1 or by a strong positive signal at point 10. In either event, the grid of tube 2 is made very negative with respect to the cathode thereof and no current flows between the cathode and plate.

In a typical amplifier stage such as that of Figure 1, the value of resistance 3 may be 5,000 ohms, resistance 4 100,000 ohms and resistance 6 500,000 ohms. Condenser 5 may be 0.05 microfarad and the value of plate voltage at point 9 be 300 volts. With a tube drawing normal plate current of 1.5 ma., the voltage at point 8 in normal operation will be in the neighborhood of 150 volts.

Figure 2:
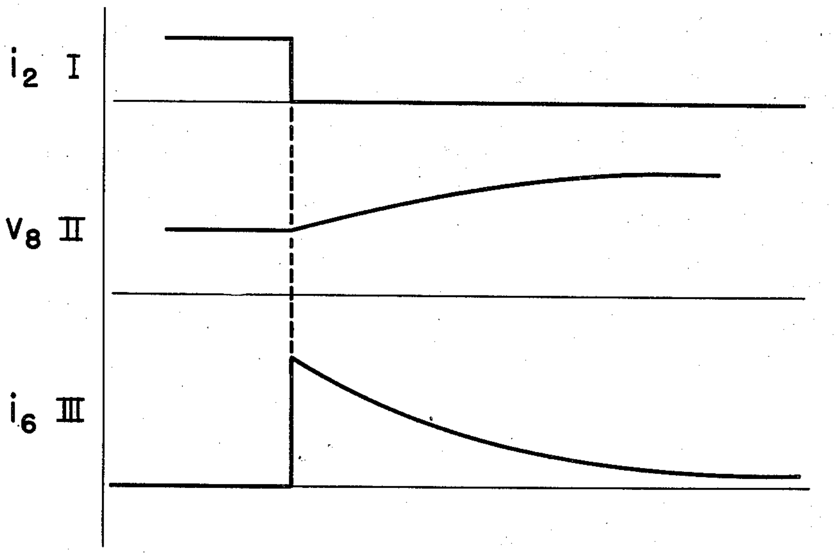
Figure 2 shows the voltage variation within the amplifier of Figure 1 when cut-off bias is suddenly applied.

Figure 2 shows in detail the voltages and currents within the circuit of Figure 1 when plate current is suddenly cut off in tube 2. Curve I shows the plate current of tube 2 and consists of a sudden decrease from normal value to zero at the instant cut-off bias is applied. Curve II shows the voltage of point 8. In this case a constant value of voltage, for example 150 volts, is maintained until cut off bias is applied. At this instant, the voltage rises exponentially to the final steady state value, for example 300 volts. The time constant of this rise is the time constant of the circuit, 0.03 second for the above listed circuit values. Curve III shows the current drawn through resistance 6 when cut off bias is suddenly applied. In this case, the current is zero up to the point cut off bias is applied at which time a sudden current surge takes place which is later reduced to zero. The magnitude of this surge for the above listed circuit values is 0.25 ma. This sudden current change corresponds to the charging of condenser 5 as shown in curve II, having a high value when the condenser voltage is rapidly increasing and a lower value as the rate of increase in condenser voltage is reduced. Inasmuch as the current surge through resistance 6 produces a voltage drop across that resistance which is applied to grid 7 of the succeeding stage, this surge causes a signal in the following amplifier stages, thereby causing noise.

In the particular case of an amplifier having the designs illustrated above, the initial value of voltage applied to the grid of the succeeding stage when cut off takes place is equal to 81.3% of 150 volts or about 125 volts. This voltage is very large as compared with normal signal voltage and, because it suddenly rises from zero to this value and then rapidly decays to zero, is particularly annoying in the remaining amplifier stages.

Figure 3:
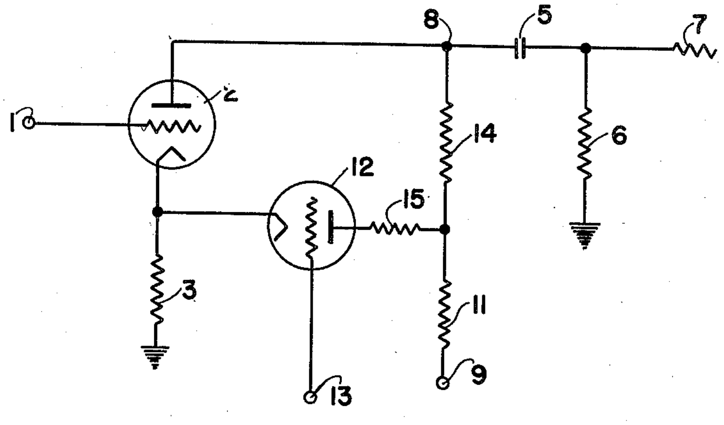
Figure 3 shows the circuit diagram of one embodiment of my invention.

Figure 3 shows a circuit whereby the above mentioned difficulty may be avoided. In this figure, the plate resistance 4 of Figure 1 is replaced by two resistances 14 and 11 having their common connection, connected to the plate of grid controlled tube 12 through resistance 15. The cathode of tube 12 is connected to the cathode of tube 2 and the grid of tube 12 is connected to a source of potential to control the conduction therethrough, the tube 12 being biased substantially to cut-off. Operation of my invention as shown in Figure 3 is as follows. When it is desired to cause vacuum tube 2 to become insensitive to input signals, a positive voltage is applied to grid 13 of tube 12. This causes conduction to take place through tube 12 and a voltage drop to occur in resistance 3. The voltage drop across resistance 3 is raised sufficiently to bias the cathode of tube 2 to cut-off bias with respect to the grid and thereby prevent plate current flow through tube 2. At the same instant, the current drawn by tube 12, passing through resistance 11, produces a voltage drop sufficient to cause point 8 to remain at its value before the cut-off. Hence there is no tendency for condenser 5 to charge or discharge. There is, therefore, no current flow through resistance 6 and no voltage applied to grid 7 of the succeeding stage.

Figure 4:
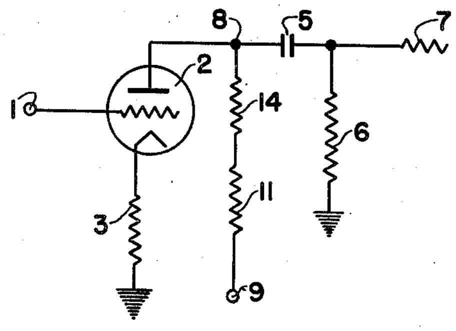
Figure 4 shows the equivalent circuit of my invention as shown in Figure 3 for the normal operating condition of the amplifier.

Figure 4 shows in more detail the conditions within the circuit of Figure 3 for the case of tube 2 in the normal signal responsive condition. Inasmuch as grid controlled tube 12 is inoperative during this condition, it is not shown on the diagram of Figure 4. It is evident that when the combined resistance of resistances 11 and 14 is equal to the resistance of resistance 4, Figure 1, the two circuits are identical. Operation during the signal responsive condition is therefore not affected by addition of the grid controlled tube.

Figure 5:
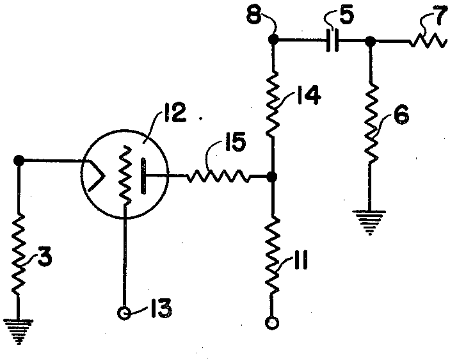
Figure 5 shows the equivalent circuit of my amplifier shown in Figure 3 for the condition of cut-off bias.

Figure 5 shows the equivalent circuit of Figure 3 for the case of the conditions wherein the circuit is not responsive to input signals. In this case tube 2 is cut-off and is therefore omitted from the circuit. Current flow through grid controlled tube 12 causes a voltage drop in resistance 3 to cut-off bias on tube 2 and in resistance 14 to maintain point 8 at the same value as before the cut-off. For example, with the value of resistance 3 of 5,000 ohms the value of resistance 14 may be made 62,500 ohms, resistance 11, 37,500 ohms and resistance 15, 28,500 ohms. Using an 884 grid controlled tube, 12, current flow through tube 12 will then be about 4 ma. and will cause the cathode of tube 2 to become 20 volts positive with respect to the grid. This will bias tube 2 to cut-off and cause point 8 to have a voltage of 150 volts, the same value as when tube 2 is in the normal operated condition.

Figure 6:
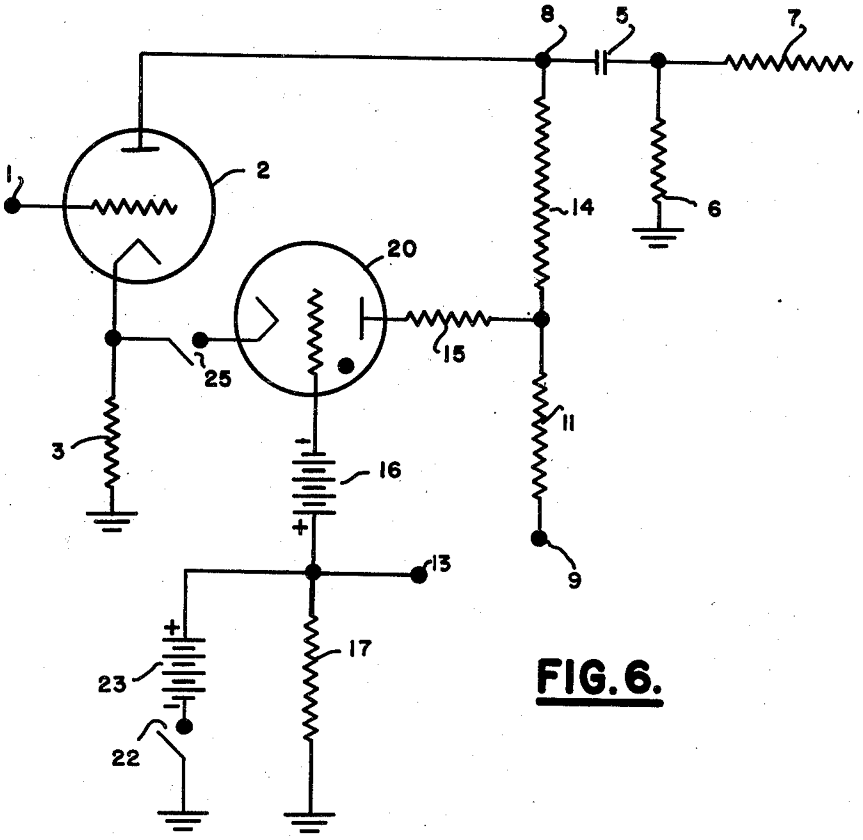
Fig. 6 is a schematic circuit diagram of a modification of my invention employing a gas tube.

It will be apparent to those skilled in the art that either a vacuum tube or a gas tube may be employed in the present invention. The circuit shown in Fig. 6 of the drawing is similar to that described in my co-pending application No. 696,-925, now Patent No. 2,493,336, and employs a gas-tube having a hot cathode. In this circuit, the tube 12 is replaced by the gas tube 20, the grid of which tube is connected to ground through the battery 16 and the resistance 17, the battery 16 providing sufficient bias to maintain the tube 20 normally non-conducting. The application of a positive voltage to the terminal 13 will raise the grid potential sufficiently to allow conduction through the tube which will raise the potential of the cathode of tube 2 to prevent conduction through tube 2, as previously discussed. If desired, a source of positive potential 23 may be connected between ground and the grid of tube 20 through the switch 22.

When it is desired to render the tube 2 operative, the switch 25 is opened to stop the conduction of tube 20, thus allowing the grid of tube 20 to regain control and resetting the circuit to its original condition.

The basic principle of my invention is that of maintaining the voltage at coupling condenser 5 constant during the sudden cut-off of plate current of tube 2. It will be evident to those skilled in the art that other methods may be used of accomplishing this result. For instance, an auxiliary circuit having a direct voltage source equal to the normal potential drop across resistance 4, Figure 1, may be switched into the circuit each time tube 2 is biased to the cut-off value. This switching could be accomplished by a grid controlled tube or other means.

I claim:

1. In an amplifying tube circuit, a first tube having an anode, a cathode and a control grid, an input circuit adapted to be connected to a signal voltage source, means impressing said signal voltage on the control grid of said first tube, circuit means connecting said cathode of said first tube to ground through a resistor and said anode to the positive terminal of said direct current power source through a tapped plate resistor, an output circuit for said amplifying tube circuit comprising a coupling condenser connected to the anode of said tube, a second tube having an anode, a cathode and a control grid, circuit means connecting the cathode of said second tube to the cathode of said first tube and the anode of said second tube to the tap on said plate resistance, biasing means interconnecting said second control grid and ground to render said second tube non-conducting, whereby said first tube transmits the voltage impressed on its input circuit to its output circuit, and means for applying a positive voltage to the control grid of said second tube to render said second tube conducting, whereby said first tube is rendered non-conducting by the voltage produced by said cathode bias resistor and the anode voltage of said first tube is maintained substantially unchanged by the voltage drop produced in said anode resistor.

2. In an amplifying tube circuit, a first vacuum tube having a cathode, an anode, and a control grid, a cathode biasing resistance connecting said cathode to ground, a plate resistance connecting said anode to the positive terminal of said direct current source, an input circuit for said tube adapted to impress a signal to be amplified on the control grid thereof, an output circuit connected to the anode of said tube, a second tube having an anode, a cathode, and a control grid, circuit means connecting the cathode of said second tube to the cathode of said first tube and resistive means connecting the anode of said second tube to the anode of said first tube, means for rendering said second tube normally non-conducting, whereby said first tube operates to conduct said input signal to said output circuit, and means for rendering said second tube conducting, whereby said first tube is biased to cut-off by the voltage drop produced in said cathode resistance and the potential of the anode of said first tube is maintained substantially unchanged by the voltage drop produced in said plate resistor.

3. In an amplifier circuit, a first amplifier tube having an anode, a cathode, and a control grid, a cathode biasing resistor connecting said cathode to ground, a tapped plate resistance connecting said anode to a positive source of direct current with respect to ground, an input circuit adapted to impress a signal voltage on the control grid of said tube, an output circuit for said tube connected to the anode thereof, a second tube having an anode, a cathode and a control grid, the cathode of said second tube being connected to the cathode of said first tube and the anode of said second tube being connected to the tap on said plate resistor, biasing means for rendering said second tube non-conducting, whereby said first tube operates as an amplifier to transmit the signal impressed on the control grid thereof to the output circuit, and means for rendering said second tube conducting whereby said first tube is rendered non-conducting by the voltage drop produced across said cathode biasing resistor and the anode potential of said first tube is maintained substantially unchanged by the voltage drop produced in the portion of the plate resistance in series with the anode circuit of said second tube.

4. In an amplifier circuit, a vacuum tube having an anode, a cathode, and a control grid, a cathode biasing resistor connecting said cathode of said vacuum tube to ground, a plate resistor connecting said anode of said vacuum tube to a positive source of direct current relative to ground, means for impressing a signal voltage on the control grid of said vacuum tube, an output circuit connected to the anode of said vacuum tube, a gas tube having an anode, a cathode, and a control grid, circuit means connecting the cathode of said gas tube to the cathode of said vacuum tube, resistive means connecting said anode of said gas tube to the anode of said vacuum tube, means for normally maintaining said gas tube non-conducting, and means for selectively rendering said gas tube conducting whereby said vacuum tube is rendered non-conducting by the voltage drop of said cathode biasing resistor produced by conduction of said gas tube, and the anode potential of said vacuum tube is maintained substantially unchanged by the voltage drop produced in said plate resistance.

5. In an amplifier tube circuit, a vacuum tube having an anode, a cathode, and a control grid, a tapped plate resistor connecting said anode to a positive source of direct current relative to ground, a cathode resistor connecting said cathode to ground and adapted to bias said control grid negative with respect to said cathode, means for impressing a signal on the control grid of said vacuum tube, an output circuit connected to said anode of said vacuum tube responsive to the potential thereof relative to ground, a gas tube having an anode, a cathode, and a control grid, normally closed switch means connecting the cathode of said gas tube to the cathode of said vacuum tube, and resistive means connecting the anode of said gas tube to the tap on said plate resistor, biasing means for normally maintaining said gas tube non-conducting, whereby said vacuum tube is responsive to said signal voltage to transmit said signal voltage to said output circuit, and means for selectively applying a positive bias to the grid of said gas tube to render said gas tube conducting, whereby said vacuum tube is rendered non-conducting by the voltage drop produced by the cathode resistor and the anode voltage is maintained substantially unchanged by the voltage drop produced in said plate resistor, said gas tube being returned to its non-conducting condition by operation of said normally closed switch means.

MICHAEL J. BURGER.

REFERENCES CITED

The following references are of record in the file of this patent:

UNITED STATES PATENTS

| Number | Name | Date |
|---|---|---|
| 2,185,367 | Blumlein | Jan. 2, 1940 |
| 2,300,999 | Williams | Nov. 3, 1942 |
| 2,482,561 | Shenk | Sept. 20, 1949 |